Jan. 21, 1969   H. A. PANISSIDI   3,422,538
MOTION GENERATING MECHANISM
Filed Nov. 18, 1965

INVENTOR.
HUGO A. PANISSIDI
BY
ATTORNEY

Jan. 21, 1969    H. A. PANISSIDI    3,422,538
MOTION GENERATING MECHANISM
Filed Nov. 18, 1965    Sheet 3 of 5
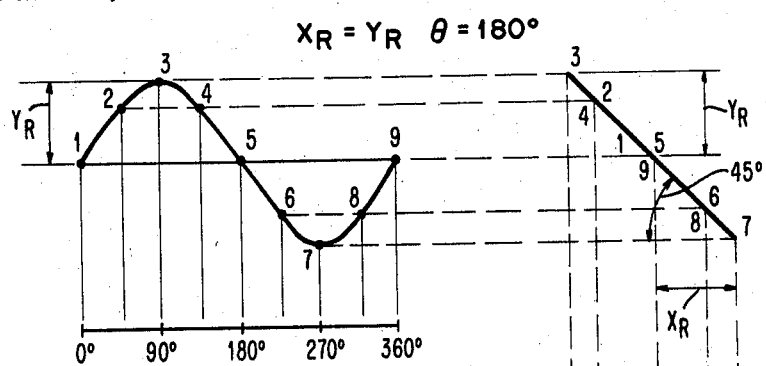
FIG. 4
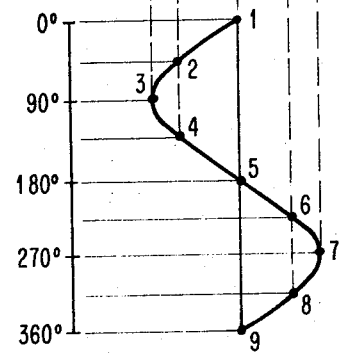
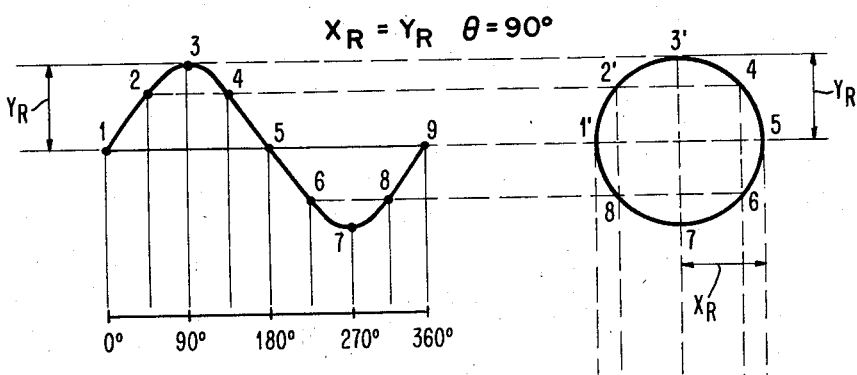
FIG. 5
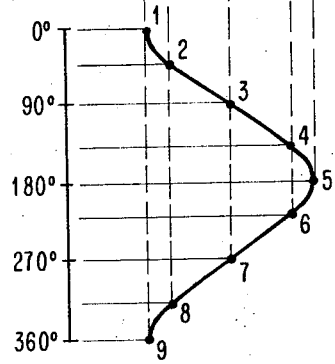

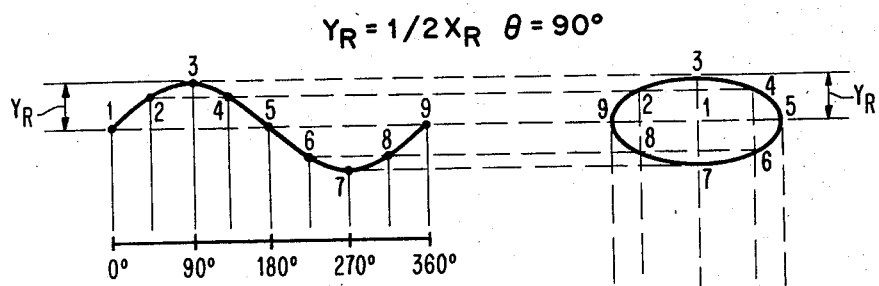
FIG. 6
FIG. 7
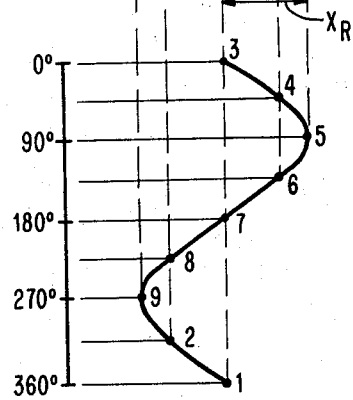
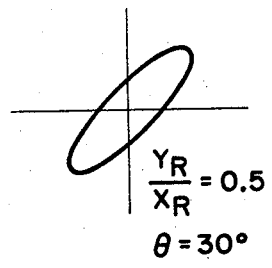
FIG. 8   FIG. 9
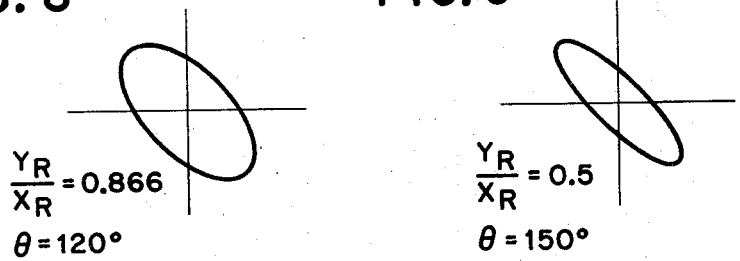

United States Patent Office 3,422,538
Patented Jan. 21, 1969

3,422,538
MOTION GENERATING MECHANISM
Hugo A. Panissidi, Peekskill, N.Y., assignor to International Business Machines Corporation, Armonk, N.Y., a corporation of New York
Filed Nov. 18, 1965, Ser. No. 508,516
U.S. Cl. 33—26
Int. Cl. B43l 11/00
19 Claims

ABSTRACT OF THE DISCLOSURE

A drafting machine has a combined X and Y coordinate line plotter driven by separate hydraulic piston adders. Separate Scotch yoke devices are mounted between the ends of each of the piston adders and a fixed frame of the machine. Adjustable pins on each of the Scotch yokes vary the amplitude of the harmonic thrust given thereby in the X and Y directions. A third hydraulic piston adder is mounted between the two Scotch yokes to arcuately adjust one relative to the other to set the phase relationship so that variously slanted lines or ellipses may be drawn as well as the regular lines, circles, and ellipses.

---

The present invention relates to a mechanism for moving a point in a plane in linear, angular, and arcuate directions, and more particularly to a mechanical apparatus for driving a movable point in circular, elliptical, and angular directions. In various instances it is desirable to drive a point in a plane according to predetermined motion. For example, automated drafting machines wherein a stylus is moved over a sheet of paper in response to a driving means operated by suitable input signals. Another example is in manufacturing operations where a machine tool such as a cutting edge or a drill is moved in particular paths with respect to an article being manufactured by suitable driving means operating from predetermined input signals. A commonly known method for accomplishing this function is to position the movable point within a reference defined by Cartesian co-ordinates. The movable point is then driven in the X and Y directions by associated crossarm mechanisms or the like in response to input signals. When only the resultant position of the movable point rather than the path described in arriving at the resultant position is to be considered, it is simplest to operate the mechanism exclusively in the X and Y rectilinear directions. If, on the other hand, the path described by the movable point is important, such as in the case of a drafting machine where the motion of the stylus describes a line on a paper, then it is necessary that the driving mechanism be capable of describing circular, elliptical, and angular paths. In such instances the combined movements of the X and Y driving mechanisms are required. Thus, if a stylus is driven in the X direction and in the Y direction at the same time, and at the same speed, the resultant path described will be at a 45° angle with respect to the X and Y axes. Much more difficulty is encountered when a circle or an ellipse, or a portion thereof, is to be produced. In such instances the path is usually approximated by a series of small interconnected straight lines which form chords of the circle to be approximated. For the approximated circle to appear realistic, a great number of small interconnected lines are required. However, this requires that a large number of separate input command signals be applied to the driving means. In automated systems which operate from punched paper tape or magnetic tape, etc., this means that a large percentage of the storage area of the tapes will be occupied by the program steps necessary for generating circles or ellipses and that a relatively large amount of time is required for producing the circle or ellipses, and the circles and ellipses so generated will not be mathematically true.

It would be much more desirable to have a mechanism capable of generating mathematically true circles and ellipses in a minimum time and requiring relatively few input instructions to the driving means.

An object of the present invention is to provide a mechanism for driving a movable point through circular, elliptical, and linear paths.

The foregoing and other objects, features and advantages of the invention will be apparent from the following more particular description of a preferred embodiment of the invention, as illustrated in the accompanying drawings.

In the drawings:

FIGS. 2 through 9 illustrate selected examples of patterns which may be generated with the mechanism of FIG. 1.

Figure 1:
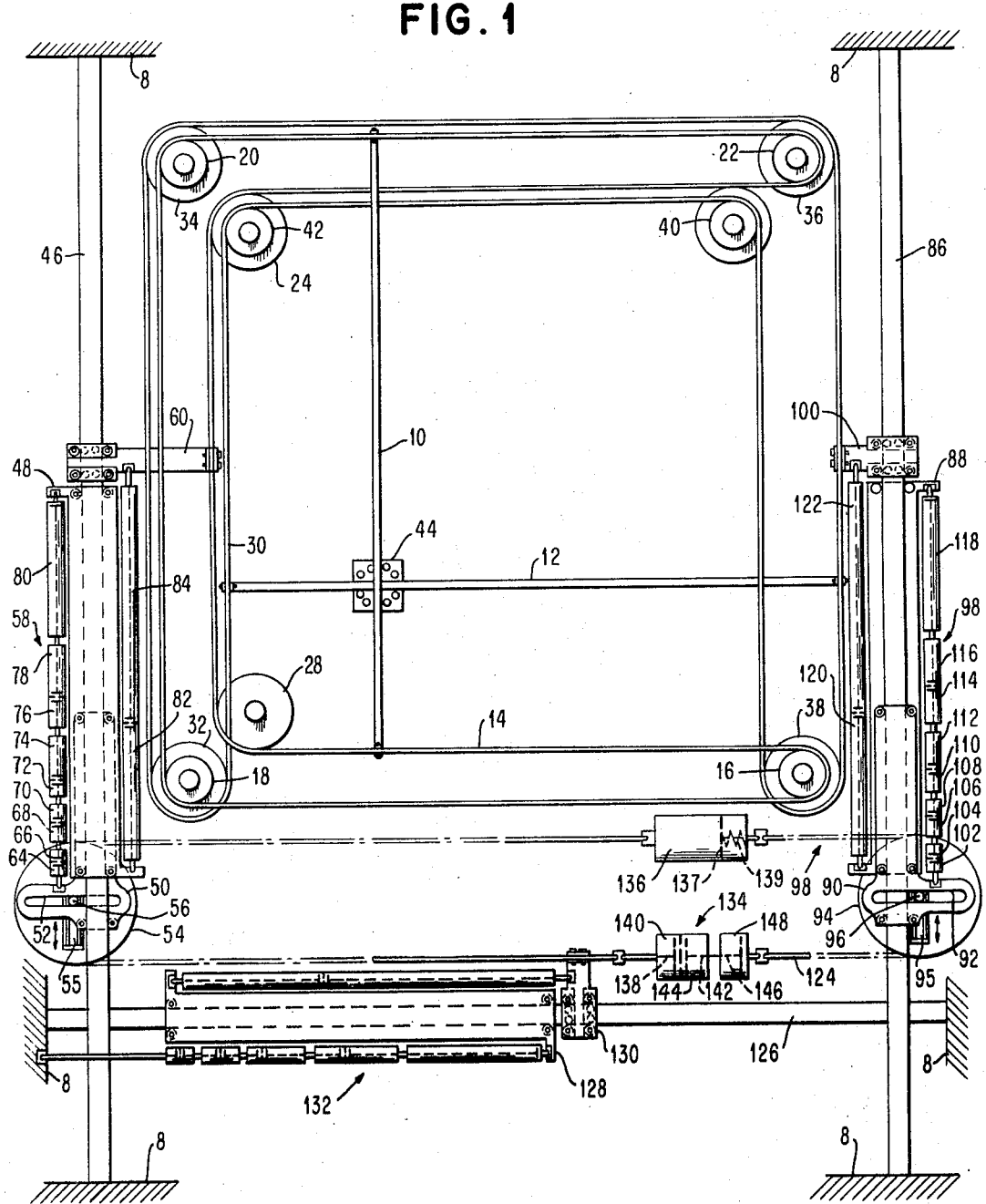
FIG. 1 is a schematic diagram of an embodiment of a mechanism following the principles of the present invention.

Referring to FIG. 1, an X–Y crossbar mechanism is shown including an X bar 10 and a Y bar 12. X bar 10 is connected at either end to a cable 14. Cable 14 is mounted on idler pulley wheels 16, 18, 20, 22, 24, and 28 which are rotatably connected to a stationary frame 8. Any movement of cable 14 results in a corresponding movement of X bar 10 in the horizontal direction. Y bar 12 is connected at either end to a cable 30 which is mounted on idler pulley wheels 32, 34, 36, 38, 40, and 42 which are also rotatably mounted on stationary frame 8. Any movement of cable 30 produces a corresponding movement of Y bar 12 in the vertical direction. A platform 44 is mounted to both the X bar 10 and the Y bar 12 by means of roller wheels or the like and will always be positioned at the intersection of the X and Y crossbars. Associated with the X–Y crossbar mechanism are two driving mechanisms. The first driving mechanism is clamped to and moves cable 14, thus producing a corresponding movement of the X crossbar 10. This will be referred to as the X drive mechanism. A second driving mechanism is connected to and moves cable 30 and correspondingly moves Y crossbar 12. This will be referred to as the Y driving mechanism. The X driving mechanism includes a track 46 rigidly mounted to frame 8. A first member 48 is mounted on track 46 and is free to move back and forward thereon. Member 48 may be in the form of a channel. A second member 50 is also mounted on and is free to move on track 46. Member 50 may also be a channel, however, member 50 terminates at its end in a Scotch yoke mechanism including a slot 52. The other portion of the Scotch yoke mechanism is wheel 54 having a pin 56 fitted into slot 52. Wheel 54 is rotatably mounted on frame 8. Member 50 is rigidly connected to member 48 by a piston adder mechanism 58. A clamp 60 is also mounted on and is normally free to move on track 46. Clamp 60 is rigidly connected to member 48 by a second portion of piston adder mechanism 58.

A piston adder apparatus is a fluid actuated assembly which may be linearly extended to a plurality of predetermined lengths. A representative piston adder mechanism may consist of a plurality of interconnected piston cylinders each having either a single piston rod or containing two back-to-back piston rods located in two separate chambers within each piston cylinder.

In FIG. 1, the piston chambers included in piston adder mechanism 58 are indicated by reference numbers 64, 66, 68, 70, 72, 74, 76, 78, 80, 82, and 84. Each of the piston chambers are back-to-back with the exception of piston chamber 80 which, by way of example, is a single piston chamber within the piston cylinder. Each of the piston chambers has associated therewith an input and an exhaust tube system via which fluid may be introduced and removed from the chamber by means of a valve, pump, and reservoir arrangement. When fluid under pressure is introduced to any chamber, the piston rod therein moves the length of the chamber, and when the fluid pressure is released, the piston rod returns to its original position. The pump, reservoir and connecting hoses are not shown in FIG. 1 because the structure and operation is well known in the art. Each of the piston chambers is twice the length of the preceding chamber, thus, chamber 64 is 1/64 of an inch in length, piston chamber 66 is 1/32 of an inch in length, piston chamber 68 is 1/16 of an inch in length, piston chamber 70 is 1/8 of an inch in length, piston chamber 72 is 1/4 of an inch in length, piston chamber 74 is 1/2 of an inch in length, piston chamber 76 is 1 inch long, piston chamber 78 is 2 inches long, piston chamber 80 is 4 inches long, piston chamber 82 is 8 inches long, and piston chamber 84 is 16 inches long. This is referred to as a binary progression.

When all the piston rods are in their initial or retracted position, the piston adder mechanism is at its zero position. By causing the individual piston rods to move either singly or in combination (by input fluid pressure), the piston adder mechanism shown in FIG. 1 can be extended to a distance up to 31 63/64 inches from the zero position or at any distance in between at increments of 1/64 of an inch. For example, if the piston rod within chamber 64 were actuated, the entire piston adder mechanism would extend 1/64 of an inch. Clamp 60, being connected to the end of the piston adder mechanism, would therefore move 1/64 of an inch. If the piston rod within chamber 82 were actuated, the piston adder mechanism, and consequently clamp 60, would move 8 inches. It may be seen that combinations of the piston rods within the various piston chambers may be actuated at the same time providing for a total distance equal to the sum of the lengths of the piston chambers actuated. The piston adder mechanism as described is known in the art and an example of a piston adder mechanism which may be employed in the present invention is described in U.S. patent application, Ser. No. 411,066, now U. S. Patent No. 3,266,377, entitled, "Piston Adder Apparatus," filed Nov. 13, 1964, in the name of Hugo A. Panissidi and assigned to the present assignee.

The piston rod within piston chamber 64 is connected to the Scotch yoke portion of member 50, which is in turn connected via pin 56 to the wheel 54, which is connected to the stationary frame 8. Thus, when any of the piston rods within piston chambers 64, 66, 68, 70, 72, 74, 76, 78, or 80 are moved, the member 48 will move linearly a like amount along track 46 with respect to the frame 8. Member 48 is connected via piston chambers 82 and 84 to the clamp 60. Thus, clamp 60 will likewise move with respect to frame 8. Clamp 60, being connected to cable 14 will move cable 14 and thus the X bar 10 will be moved a linear distance equal to the total movement of the piston adder mechanism. If the piston rods within piston chambers 82 or 84 are also moved, the clamp 60 will move a like amount with respect to member 48. Piston chambers 82 and 84 are shown in a folded-back position with respect to piston chamber 64 through 80 in order to conserve space. It is understood that if space were not a consideration, piston chambers 82 and 84 could be connected in a linear fashion with the end of piston chamber 80 and would function in the same manner.

The Y drive mechanism is identical to the X drive mechanism, that is, it consists of a track 86 rigidly mounted to frame 8 which is equivalent to track 46. A first member 88, equivalent to member 48, is mounted on track 86 and is free to move back and forward thereon. Member 88 may be in the form of a channel. A second member 90, equivalent to member 50, is also mounted on and is free to move on track 86. Member 90 may also be a channel. Member 90 terminates at its end in a portion of a Scotch yoke mechanism including a slot 92. The other portion of the Scotch yoke mechanism is wheel 94 having a pin 96 fitted into slot 92. Wheel 94 is rotatably mounted on frame 8. Member 90 is rigidly connected to member 88 by a piston adder mechanism 98 which is identical to piston adder mechanism 58. A clamp 100 is also mounted on and is normally free to move on track 86. Clamp 100 is identical to clamp 60 except that it is connected to cable 30.

Piston adder mechanism 98 includes six piston cylinders having piston chambers 102, 104, 106, 108, 110, 112, 114, 116, 118, 120, and 122. Piston adder mechanism 98 is the same as piston adder mechanism 58, that is, each of the piston chambers has a length which is twice that of the preceding one. Piston chamber 102 has a stroke length of 1/64 of an inch and each subsequent piston chamber is twice that length (binary progression) up to piston chamber 122 which has a length of 16 inches. The piston rods within each of the piston chambers are actuated by fluid pressure introduced via input and output hoses which are not shown. The piston rods within the piston chambers of the piston adder mechanism 98 may be actuated singly or in combination so that clamp 100 may be moved incremental distances of 1/64 of an inch up to a total of 31 63/64 inches from the zero, or retracted, position of the piston adder mechanism. Clamp 100 is attached to cable 30, which is in turn attached to the Y crossbar 12. Thus, the Y crossbar 12 is moved a distance equal to the distance that the piston adder mechanism is extended.

What has been described thus far is a mechanism whereby an X crossbar 10 may be moved any incremental distance up to 31 63/64 inches by selective actuation of given piston chambers of a piston adder mechanism 58. The piston adder mechanism 58 causes a clamp 60 to move relative to stationary frame 8. Clamp 60, being connected to cable 14, causes the X crossbar mechanism 10 to move the same distance that the piston adder mechanism was extended. Likewise, a Y crossbar 12 may be moved in incremental distances up to 31 63/64 inches by selective actuation of piston chambers within a piston adder mechanism 98. Piston adder mechanism 98, when actuated, causes a clamp 100 to move relative to stationary frame 8, clamp 100 being connected to cable 30 ultimately causes a movement of Y crossbar 12 to move a distance equal to the extension of piston adder mechanism 98. When X crossbar 10 is moved, platform 44 will move correspondingly in a horizontal manner in the X direction. When Y crossbar 12 is moved, platform 44 will move correspondingly in the vertical, or Y direction. It is to be noted in the preceding discussion that member 50 of the X driving mechanism and member 90 of the Y driving mechanism, although slidably mounted on their respective tracks 46 and 86, did not move when their associated piston adder mechanisms were actuated. This is because member 50 and member 90 contain slots 52 and 92, respectively, in which pins 56 and 96, respectively, are fitted. Pin 56 is connected to wheel 54 which, in turn, is mounted at its center to stationary frame 8. Likewise, pin 96 is connected to wheel 94 which is mounted at its center to stationary frame 8. Member 50, containing slot 52 and pin 56 in slot 52 connected to wheel 54 form a mechanism known as a Scotch yoke. Likewise, member 90, with slot 92 and pin 96 positioned in slot 92 and connected to wheel 94 also form a Scotch yoke mechanism. In mechanical terminology member 50 and member 90 would be referred to as a slotted crosshead, and wheel 54, containing pin 56, and wheel 94, containing pin 96, are referred to as cranks. Pin 56 is shown located at the center of rotation of wheel 54. Therefore, if wheel 54 were rotated, no mechanical action would result. Likewise, pin 96 is shown located at the center of rotation of wheel 94 so that if wheel 94 were rotated, no mechanical action would result. Note, however, that wheel 54 has a track 55 attached thereto on which pin 56 is movably mounted and that wheel 94 has an attached track 95 on which pin 96 is movably mounted. In a manner to be explained later, pin 56 may be positioned along track 55 at predetermined distances from the center of rotation of wheel 54. Likewise, pin 96 may be positioned on track 95 at predetermined distances from the center of rotation of wheel 94. When positioned, pin 56 or pin 96 may be made rigidly fixed to tracks 55 and 95, respectively, and be therefore immovable. With pin 56 rigidly mounted at a distance from the center of rotation of wheel 54, when wheel 54 is rotated it will cause member 50 to move linearly back and forth along the track 46. The distance that the pin 56 moves during rotation measured in a direction at right angles to slot 52 will be the same distance as the movement of member 50 along track 46. The same is true for the Y driving mechanism. It is well known that when wheel 54 rotates, the member 50 will be given harmonic motion. That is, as pin 56 moves along a circular path, member 50 will have a harmonic displacement along the track 46. The same is true for member 90. As wheel 94 rotates, member 90 will move with harmonic displacement. Thus, member 50, being connected to clamp 60 through the X driving mechanism will cause clamp 60 to move harmonically as wheel 54 rotates. Likewise, member 90, being connected to clamp 100 through the Y driving mechanism, will cause harmonic movement of clamp 100 as wheel 94 rotates. The total limits of the harmonic motion of clamp 60 will be equal to twice the distance between the position of pin 56 on track 55 and the center of rotation of wheel 54. Likewise, the limits of the harmonic motion of clamp 100 is equal to twice the distance between pin 96 on track 95 and the center of rotation of wheel 94. Clamp 60, being connected to cable 14, it follows that X crossbar 10 will move horizontally back and forth in a harmonic manner as wheel 54 rotates and clamp 100, being connected to cable 30, it follows that Y crossbar 12 will move vertically back and forth in a harmonic manner as wheel 94 rotates.

Harmonic motion is equivalent mathematically to the sinusoidal function, thus, it is also accurate to say that X crossbar 10 and Y crossbar 12 move sinusoidally in the horizontal and vertical directions, respectively, as wheels 54 and 94 rotate. The motions of the X crossbar 10 and the Y crossbar 12 are combined and produce a resultant motion at platform 44. Thus, platform 44 will describe a motion which is the combination of the sinusoidal motion of X crossbar 10 in the horizontal direction and the sinusoidal motion of Y crossbar 12 in the vertical direction. It is the combination of the vertical and horizontal sinusoidal motions which enable circles, ellipses, and segments thereof to be generated.

Figure 2:
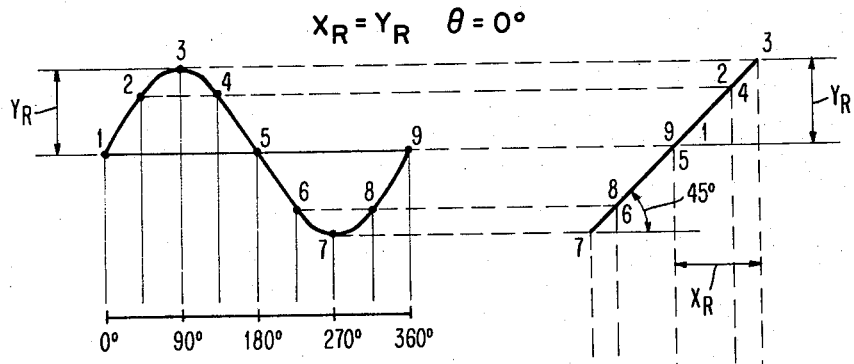
Figure 2:
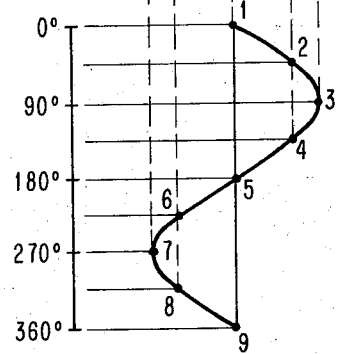

Referring to FIGS. 2 through 9 a series of waveforms are shown which represent a horizontal sinusoidal motion and a vertical sinusoidal motion and the resultant patterns produced when the two sinusoidal motions are combined in various ways. In FIG. 2 it is seen that a horizontal sinusoidal motion and a vertical sinusoidal motion having the same phase and the same amplitude, when combined, result in a straight line at an angle of 45 degrees with the horizontal.

Figure 3:
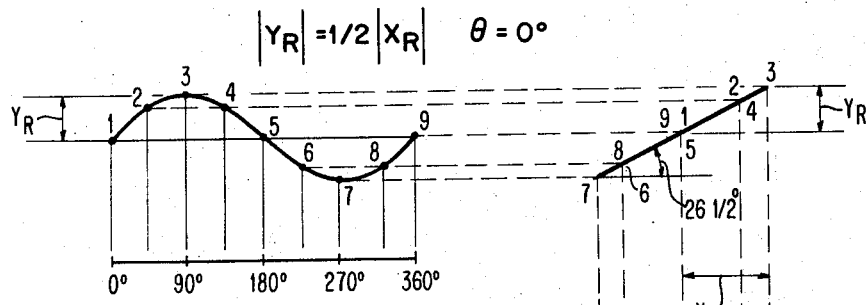
Figure 3:
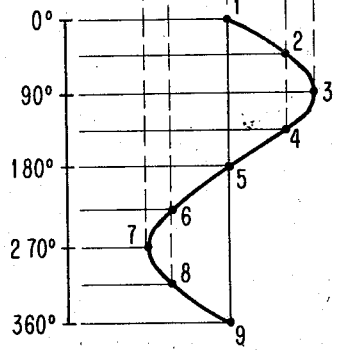

In FIG. 3, the two sinusoidal motions are in phase, but the amplitude of the horizontal waveform ($Y_R$) is one-half that of the vertical waveform ($X_R$). This produces a straight line at an angle of 26½ degrees with the horizontal. It follows that if the horizontal and vertical sinusoidal waveforms are maintained in the same phase, but the amplitudes are varied, a straight line will result having an angle with respect to the horizontal which is proportional to the amplitude differences of the two sinusoidal waves.

In FIG. 4, the vertical sinusoidal wave is 180° out of phase with the horizontal sinusoidal wave, but the amplitudes are the same. This produces a straight line at an angle of 45° with the horizontal but extending in the left direction. If the sinusoidal waves were maintained at 180° phase differences and the amplitudes varied, a straight line extending to the left would result but having an angle with the horizontal proportional to the difference in amplitudes of the two sinusoidal waves.

In FIG. 5, the horizontal and vertical sinusoidal waves are phase displaced 90° but have the same amplitude. The resultant of the combined waves is a true mathematical circle having a diameter equal to the peak-to-peak maximum of the sinusoidal wave. Referring to FIG. 6, the horizonital and vertical sinusoidal waves are maintained at a phase difference of 90°, but the ampltude of the two sinusoidal waves differ. The resultant pattern produced by the combined sinusoidal waves is a true mathematical ellipsis having a major axis equal to the amplitude of the larger sinusoidal wave and a minor axis equal to the amplitude of the smaller sinusoidal wave. A family of ellipses can be produced having predetermined major and minor axes by combining horizontal and vertical sinusoidal waves having appropriate amplitudes.

FIGS. 7, 8, and 9 depict other patterns which may be produced by appropriate settings of sine wave amplitudes and phase displacements between the sine waves. FIGS. 7, 8, and 9 include information as to the ratio of the sine wave amplitudes and the phase angle difference between the sine wave which produce the pattern. It follows that an entire family of resultant patterns can be effected by varying relative phase angles and amplitudes between horizontal and vertical sine waves. It is possible to produce and observe this family of patterns by combining various horizontal and vertical sine waves electronically in a cathode ray tube oscilloscope and such patterns are referred to as Lissajous figures.

It has been stated that in the structure of FIG. 1 a horizontal sinusoidal motion and a vertical sinusoidal motion can be generated and combined at platform 44. Platform 44 is thus capable of describing any of the patterns previously discussed, a selected few of which are shown in FIGS. 2–9 provided, however, that the amplitudes and the phase angles between the two sinusoidal motions imparted to X crossbar 10 and Y crossbar 12 can be selectively varied. The method of adjusting the amplitude of the sinusoidal motions as previously stated, may be accomplished by positioning pin 56 a given distance from the center of wheel 54 along track 55 and pin 96 a given distance from the center of wheel 94 along track 95. The amplitude of the horizontal sine wave as described by Y bar 12 will be directly proportional to the distance of pin 96 from the center of rotation of circle 94 and the amplitude of the vertical sine wave as described by X bar 10 will be directly proportional to the distance of pin 56 from the center of rotation of wheel 54. The manner in which pin 56 and pin 96 are positioned at predetermined distances from the center of rotation of wheels 54 and 94, respectively, is explained by reference to FIGS. 10 and 11.

Figure 10:
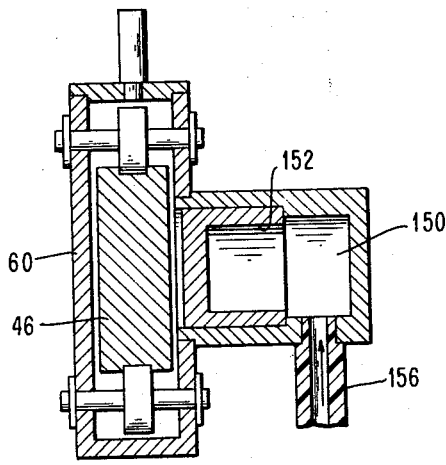
FIG. 10 is a detailed illustration of an element included in the mechanism of FIG. 1.

FIG. 10 is a detailed cross-sectional view of either clamp 60 or clamp 100. The clamp 60 is mounted on track 46 such that it is free to move back and forth thereon. Integral with the side of clamp 60 is a piston chamber 150 within which piston 152 is located. A fluid hose 156 is connected into piston chamber 150 so that, when desired, fluid under pressure may be introduced into the piston chamber causing piston 152 to bear against the side of track 46 with sufficient pressure to maintain clamp 60 immovable on track 46. When the fluid pressure is decreased, the clamp 60 is again free to move on track 46.

Figure 11:
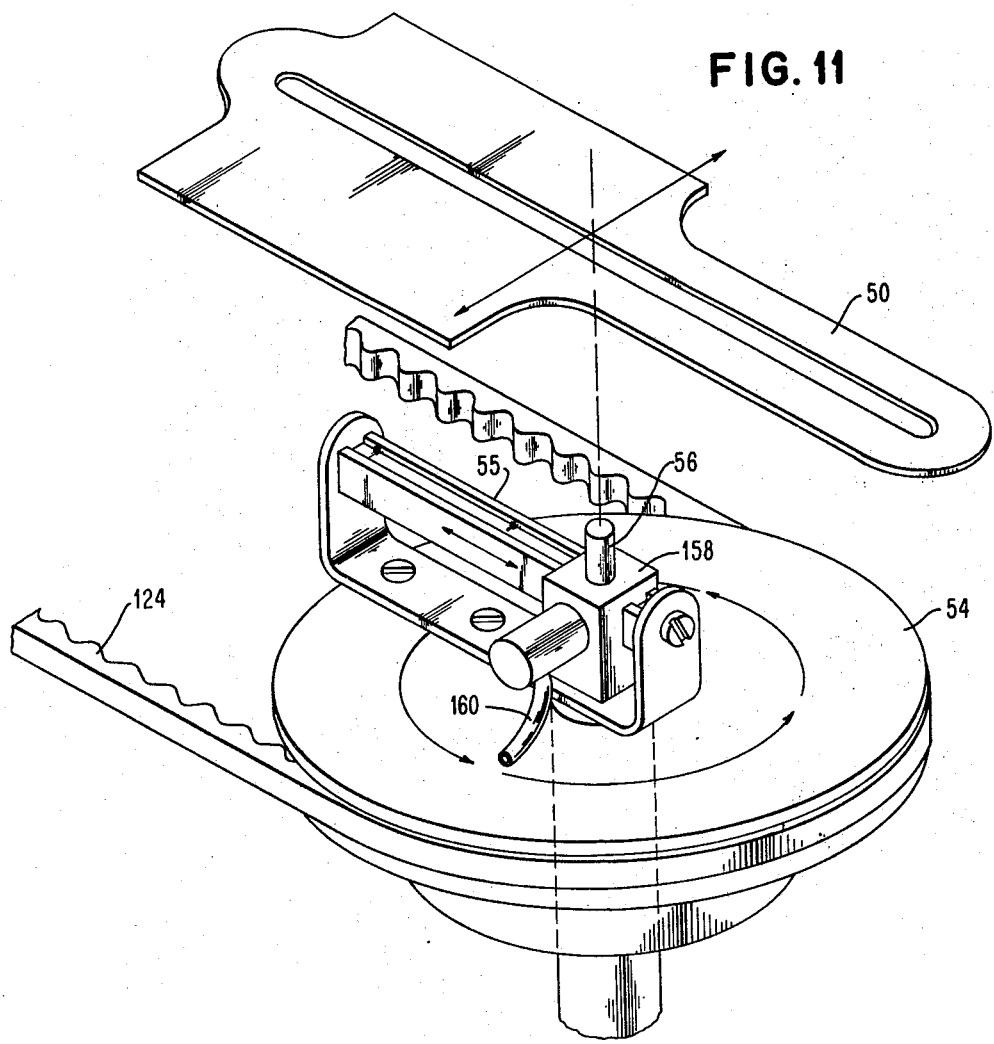
FIG. 11 is a detailed illustration of another element included in the mechanism of FIG. 1.

Referring to FIG. 11, a detailed view of wheel 54, pin 56, track 55, and member 50 is shown. FIG. 11 could also represent wheel 94, track 95, pin 96, and member 90. Pin 56 is connected to a clamp 158 which is, in detail, identical to clamp 60 and clamp 100 as depicted in FIG. 10. Clamp 158 is free to move on track 55 except when pressure is introduced via hose 160 causing the piston within clamp 158 to bear against track 55 and hold clamp 158 and consequently pin 56 rigid. Presume now that it is desired that the pin 56 on wheel 54 be moved a given distance away from the center of rotation of wheel 54. Piston adder device 132 is in its zero position, therefore, the wheel 54 (and wheel 94) are in their zero position, which referring to FIG. 1, means that the track 55 and the track 95 are parallel to the track 46 and the track 86.

The manner in which the X driving means is employed to move pin 56 a predetermined distance away from the center of rotation of wheel 54 is as follows. Initially pressure is introduced via tube 156 to clamp 60 causing clamp 60 to become immovable with respect to track 46 (see FIG. 10). The pressure in tube 160, connected to clamp 158 on which pin 56 is connected, is removed allowing clamp 158, and consequently pin 56, to move along track 55 (see FIG. 11). Piston adder mechanism 58 is then actuated. The pistons within piston adder mechanism 58 which are actuated will depend on the particular distance that pin 56 is to be moved. For example, if it is desired to move pin 56 a distance of ¼ of an inch, then the piston within piston chamber 72 is actuated causing the piston adder mechanism to extend ¼ of an inch (other piston combinations are possible which will also produce a resultant ¼ inch extension). As piston adder mechanism extends ¼ of an inch, the member 50 connected thereto will likewise extend a like amount. Pin 56, being contained within the slot 52 of member 50, will be moved ¼ of an inch from its present position at the center of rotation. When this is accomplished, the pressure in hose 160 is reapplied thereby causing pin 56 to become immovable, and the pressure in hose 156 of clamp 60 is removed permitting clamp 60 to be again freely movable on track 46. Then, if wheel 54 is caused to be rotated by the piston adder mechanism 132 through cable 124, pin 56 moving within slot 52 will cause the entire X drive mechanism and clamp 60 connected thereto to move harmonically, thereby imparting harmonic motion in the X direction to platform 44. The Y drive mechanism having duplicate components operates in the same fashion as described for the X drive mechanism.

The method of rotating wheels 54 and 94 and the method of adjusting the phase angle between the two sinusoidal waveforms will now be discussed. In FIG. 1, wheel 54 and wheel 94 are interconnected by a toothed belt 124. A third track 126 is connected to frame 8 and a member 128 is slidably mounted on track 126. A third clamp 130 is also slidably mounted on track 126 and a third piston adder mechanism 132 interconnects clamp 130, member 128, and stationary frame 8 so that actuation of the piston adder mechanism 132 will cause clamp 130 to move along track 126 a distance determined by the particular pistons of the piston adder mechanism 132 which are actuated. The piston adder mechanism 132 is identical to piston adder mechanism 58 and 98 which have already been described. Thus, clamp 130 may be moved along track 126 in increments up to a total of 31⁶³⁄₆₄ inches from the zero or reference position. Clamp 130 is connected to belt 124, therefore actuation of piston adder mechanism 132 causes belt 124 to move and belt 124, being mounted about wheels 54 and 94, will rotate the wheels. Wheels 54 and 94 are dimensioned in the present example to have a circumference such that ¹⁄₆₄ of an inch is equal to one degree of arc. Thus, a total extension of 31⁶³⁄₆₄ inches will rotate the wheels 2048°.

In FIG. 1, wheel 54 and wheel 94 are shown to be in phase, that is, the direction of track 55 and the direction of track 95 are at the same relative angle. If the two wheels were to rotate, the harmonic motion generated by the X drive mechanism and the Y drive mechanism would be in phase, and if the pin 56 and the pin 96 were displaced an equal distance from the center of their respective wheels, the resultant motion produced at platform 44 would be a straight line at an angle of 45° as shown in FIG. 2.

Two structures are connected in line and move with toothed belt 124. The first structure 134 is a piston adder mechanism. The other structure 136 is a piston chamber referred to as the bias chamber. Biased chamber 136 contains a piston 137 which is connected to chamber 136 by a spring 139 under tension which serves to maintain belt 124 tightly about wheels 54 and 94. The pistons within the piston chambers of piston adder mechanism 134 may be separately actuated the same as the other described piston adder mechanisms 58, 98, and 132. When one or more of the piston chambers are actuated, a phase displacement between wheel 54 and wheel 94 will be produced. Note that belt 124 is clamped by clamp 130, which in turn is rigidly connected through the piston adder mechanism 132 and member 128 to the frame 8. Thus, when piston adder mechanism 134 is actuated, the only portion of belt 124 that can move is the portion in contact with wheel 94. As piston adder 134 is actuated, the pistons will move causing wheel 94 to rotate in a counterclockwise direction. The additional lengthening or slack produced by the extending movement of the pistons within piston adder mechanism 134 is taken up in bias cylinder 136 by the piston 137 therein moving to the left as the tension on spring 139 is lessened. Thus, the overall length of the belt mechanism between the two wheels 54 and 94 is kept constant, but the wheel 94 is rotated with respect to wheel 54 a circumferential distance equal to the total distance of the piston movements within piston adder mechanism 134 (i.e., one degree for every ¹⁄₆₄ of an inch extension of the piston adder 134). The piston distances of piston adder mechanism 134 are designed such that the movement of piston 138 within chamber 140 produces a corresponding rotation of wheel 94 or 45°. The movement of piston 142 within chamber 144 likewise produces a rotation of wheel 94 of 45°, and the movement of piston 146 within chamber 148 produces a rotation of wheel 94 of 90°. It is therefore seen that the actuation of the pistons within piston adder mechanism 134 singly and in combination are capable of producing rotations of wheel 94 of 45°, 90°, 135°, and 180°. Thus, wheel 94 is capable of being angularly displaced with respect to wheel 54. The angular displacement between wheel 94 and wheel 54 results in a corresponding phase angle between the harmonic motion produced by the X drive mechanism and the Y drive mechanism as the two wheels are rotated in response to the actuation of piston adder mechanism 132, and the phase angle created between the two harmonic motions produces a resultant elliptical pattern at platform 44. It is understood that the phase differences between wheels 54 and 94 may be varied over a greater number of angular increments by adding additional piston chambers to piston adder 134.

What has been described is an apparatus for moving a point in a predetermined pattern. The point, which is represented by platform 44 will move in a combination of movement in an X direction and movement in a Y direction. The X direction movement and the Y direction movement are accomplished by an X driving means and a Y driving means connected to the platform 44 by means of a pulley mounted on an X crossbar and a Y crossbar arrangement. Thus, platform 44 may be moved in either an X direction or a Y direction or a resultant combination of the two directions. The apparatus also includes a means for moving the X driving means and the Y driving means according to pure harmonic motion by an X and a Y harmonic driving means. When harmonic motion in the X direction and harmonic motion in the Y direction are combined, it is possible for platform 44 to describe mathematically true circles and ellipses or segments thereof. Amplitude differences provided between the X harmonic motion and the Y harmonic motion can be provided by mechanically moving pins associated with the X and Y harmonic drive means. Phase differences between the X and Y harmonic drive means may be effected by mechanically varying the phase relationship between the X and Y harmonic drive means.

The present invention may be embodied as a drafting machine by including a stylus as part of platform 44 and having the stylus bear down upon a suitable paper underlay. The stylus may be prepositioned at various points with respect to the underlay by predetermined extensions of piston adders associated with the X and Y driving means. The X driving means, the Y driving means, and the X and Y harmonic driving means include piston adder devices and the motions produced by the piston adders are determined by applying fluid pressure to selected piston cylinders included in the piston adders. It should be obvious to one skilled in the art how fluid under pressure may be introduced selectively to the various piston chambers. A fluid pump and reservoir would be provided and fed to a series of hydraulic valves which are in turn connected to the various piston chambers by hydraulic hoses. By selective actuation of the valves the fluid can be routed to various piston chambers and the various described functions can be accomplished. It should be further obvious to one skilled in the art that the selected actuation of the hydraulic valves may be accomplished under programmed control, for example, by a punched tape or a magnetic tape providing electrical signals to the valves.

While the invention has been particularly shown and described with reference to a preferred embodiment thereof, it will be understood by those skilled in the art that various changes in form and details may be made therein without departing from the spirit and scope of the invention.

What is claimed is:

1. A drafting apparatus for drawing rectilinear lines, angular lines, circles and ellipses on any pattern area of a plurality of apparatus pattern areas including,
   means for drawing,
   a first member adapted to be moved in a first linear direction,
   first driving means connected to said first member for moving said first member in said first linear direction,
   a second member adapted to be moved in a second direction rectilinear to said first linear direction,
   second driving means connected to said second member for moving said second member in said second linear direction,
   third driving means connected to said first and second driving means for moving said first and second driving means harmonically,
   said means for drawing coupled to said first member and said second member,
   and means connected to said first member and said second member for prepositioning to a selected pattern area and moving in a resultant path determined by said harmonic movements of said first and second members in said first and second linear directions.

2. A drafting apparatus for drawing rectilinear coordinate lines, angular lines, circles and ellipses at any apparatus area determined by a pair of coordinates of a plurality of areas selectable by pairs of coordinate movements including,
   means for drawing,
   a first member adapted to be moved along a first rectangular coordinate axis,
   a second member adapted to be moved along a second rectangular coordinate axis rectilinear with said first axis,
   motion generating means connected to said first and second members for moving said first and second members with sinusoidal motion,
   and responsive means coupled to said means for drawing and connected to said first and second members for moving to a selected coordinate area and moving in a path which is the resultant of the combined sinusoidal motion of said first and second members.

3. An apparatus according to claim 2 wherein said means connected to said first and second members for moving said first and second members with sinusoidal motion includes,
   a first sinusoidal motion generating means connected to said first member and a second sinusoidal motion generating means connected to said second member,
   said first sinusoidal motion generating means moving said first member with sinusoidal motion and said second sinusoidal motion generating means moving said second member with sinusoidal motion.

4. An apparatus according to claim 3 wherein said first sinusoidal motion generating means includes means for varying the amplitude of the generated sinusoidal motion,
   and said second sinusoidal motion generating means includes means for varying the amplitude of the generated sinusoidal motion,
   and wherein said resultant path of said responsive means is representative of variations of the amplitude of said generated sinusoidal motion.

5. An apparatus for moving a point in a predetermined pattern comprising,
   a first member adapted to be moved along a first rectangular coordinate axis,
   a second member adapted to be moved along a second rectangular coordinate axis rectilinear with said first axis,
   motion generating means connected to said first and second members for moving said first and second members with sinusoidal motion, said means including a first sinusoidal motion generating means connected to said first member and a second sinusoidal motion generating means connected to said second member,
   said first sinusoidal motion generating means moving said first member with sinusoidal motion and said second sinusoidal motion generating means moving said second member with sinusoidal motion,
   responsive means connected to said first and second members for moving in a path which is the resultant of the combined sinusoidal motion of said first and second members,
   and means connected to said first sinusoidal motion generating means and said second sinusoidal generating means for varying the phase relationship between the generated sinusoidal motions,
   and wherein said resultant path of said responsive means is representative of variations in the phase relationship between the generated sinusoidal motions.

6. An apparatus for moving a point in a predetermined pattern comprising,
   a first member adapted to be moved along a first rectangular coordinate axis,
   a second member adapted to be moved along a second rectangular coordinate axis rectilinear with said first axis,
   motion generating means connected to said first and second members for moving said first and second members with sinusoidal motion, said means including a first sinusoidal motion generating means connected to said first member and a second sinusoidal motion generating means connected to said second member,
   said first sinusoidal motion generating means moving said first member with sinusoidal motion and said second sinusoidal motion generating means moving said second member with sinusoidal motion,
   responsive means connected to said first and second members for moving in a path which is the resultant of the combined sinusoidal motion of said first and second members, said responsive means being moved concurrently by both members for describing a smooth resultant path,
   means wherein said sinusoidal motion generated by said first sinusoidal generating means is equal in amplitude and 90° out of phase with respect to the sinusoidal motion generated by said second sinusoidal generating means,
   and wherein said resultant path of said responsive means is a true mathematical circle.

7. An apparatus for moving a point in a predetermined pattern comprising,
  a first member adapted to be moved along a first rectangular coordinate axis,
  a second member adapted to be moved along a second rectangular coordinate axis rectilinear with said first axis,
  motion generating means connected to said first and second members for moving said first and second members with sinusoidal motion, said means including a first sinusoidal motion generating means connected to said first member and a second sinusoidal motion generating means connected to said second member,
  said first sinusoidal motion generating means moving said first member with sinusoidal motion and said second sinusoidal motion generating means moving said second member with sinusoidal motion,
  responsive means connected to said first and second members for moving in a path which is the resultant of the combined sinusoidal motion of said first and second members, said responsive means being moved concurrently by both members for describing a smooth resultant path,
  means wherein said sinusoidal motion generated by said first sinusoidal generating means has a first amplitude and wherein said sinusoidal motion generated by said second sinusoidal generating means has a second amplitude different from said first amplitude and is 90° out of phase with respect to the sinusoidal motion generated by said first sinusoidal generating means,
  wherein means are provided for adjusting the amplitudes of said sinusoidal motion generating means digitally,
  and wherein said resultant path of said responsive means is a true mathematical ellipse.

8. An apparatus for moving a point in a predetermined pattern comprising,
  a first member adapted to be moved along a first rectangular coordinate axis,
  a second member adapted to be moved along a second rectangular coordinate axis rectilinear with said first axis,
  motion generating means connected to said first and second members for moving said first and second members with sinusoidal motion,
  responsive means connected to said first and second members for moving in a path which is the resultant of the combined sinusoidal motion of said first and second members,
  wherein said first and second members adapted to be moved along rectangular coordinate axes include first and second intersecting longitudinal crossbar members, each mounted on a separate pulley and cable arrangement for independent movement along said respective first and second rectangular coordinate axes,
  and wherein said responsive means connected to said first and second members is a member slidably mounted to said first and second crossbars at their point of intersection and wherein said responsive means moves with both said independent movement of both said crossbars along said first and second rectangular coordinate axes.

9. An apparatus for moving a point in a predetermined pattern comprising,
  a first member adapted to be moved along a first rectangular coordinate axis,
  a second member adapted to be moved along a second rectangular coordinate axis rectilinear with said first axis,
  motion generating means connected to said first and second members for moving said first and second members with sinusoidal motion, said means including a first sinusoidal motion generating means connected to said first member and a second sinusoidal motion generating means connected to said second member,
  said first sinusoidal motion generating means moving said first member with sinusoidal motion and said second sinusoidal motion generating means moving said second member with sinusoidal motion,
  responsive means connected to said first and second members for moving in a path which is the resultant of the combined sinusoidal motion of said first and second members,
  means wherein said first sinusoidal motion generating means includes a first hydraulic piston adder device connected to said first member,
  a first Scotch yoke mechanism including a slotted crosshead connected to said first hydraulic piston adder device and a rotatable crank having a pin extending through said slotted crosshead,
  and rotating means for rotating said crank for imparting sinusoidal motion through said crosshead and first piston adder device to said first member,
  and wherein said second sinusoidal motion generating means includes a second hydraulic piston adder device connected to said second member,
  a second Scotch yoke mechanism including a slotted crosshead connected to said second hydraulic piston adder device and a rotatable crank having a pin extending through said slotted crosshead,
  said second Scotch yoke crank being connected to said rotating means for imparting sinusoidal motion through said crosshead and second piston adder device to said second member.

10. An apparatus for moving a point in a predetermined pattern comprising,
  a first member adapted to be moved along a first rectangular coordinate axis,
  a second member adapted to be moved along a second rectangular coordinate axis rectilinear with said first axis,
  motion generating means connected to said first and second members for moving said first and second members with sinusoidal motion, said means including a first sinusoidal motion generating means connected to said first member and a second sinusoidal motion generating means connected to said second member,
  said first sinusoidal motion generating means moving said first member with sinusoidal motion and said second sinusoidal motion generating means moving said second member with sinusoidal motion,
  responsive means connected to said first and second members for moving in a path which is the resultant of the combined sinusoidal motion of said first and second members,
  means wherein said first and second members adapted to be moved along rectangular coordinate axes include first and second intersecting longitudinal crossbar members, each mounted on a separate pulley and cable arrangement for independent movement along said respective first and second rectangular coordinate axes,
  wherein said first sinusoidal motion generating means includes a first hydraulic piston adder device connected to said first member,
  a first Scotch yoke mechanism including a slotted crosshead connected to said first hydraulic piston adder device and a rotatable crank having a pin extending through said slotted crosshead,
  and rotating means for rotating said crank for imparting sinusoidal motion through said crosshead and first piston adder device to said first member,
  wherein said second sinusoidal motion generating means includes a second hydraulic piston adder device connected to said second member, a second Scotch yoke mechanism including a slotted crosshead connected to said second hydraulic piston adder device and a rotatable crank having a pin extending through said slotted crosshead, said second Scotch yoke crank being connected to said rotating means for imparting sinusoidal motion through said crosshead and second piston adder device to said second member, and wherein said responsive means connected to said first and second members is a member slidably mounted to said first and second crossbars at their point of intersection and wherein said responsive means moves with both said independent movement of both said crossbars along said first and second rectangular coordinate axes.

11. An apparatus according to claim 10 wherein each of said pins extending through said slotted crossheads of said first and second Scotch yoke mechanism is movably mounted on said respective cranks, and wherein said first and second piston adders include means for selectively extending said piston adders in length for moving said pins on said respective Scotch yoke cranks a corresponding length, said movement in length of said pins on said cranks being directly proportional to said amplitudes of said respective sinusoidal motion imparted by said cranks.

12. An apparatus according to claim 9 further including a belt mounted about said first Scotch yoke crank and said second Scotch yoke crank, and driving means connected to said belt for moving said belt and rotating said cranks a predetermined amount.

13. An apparatus according to claim 9 wherein said driving means includes means for rotating a one of said cranks with respect to the other of said cranks.

14. An apparatus according to claim 9 wherein said driving means includes a third piston adder device connected to said belt, and means for linearly extending said third piston adder device for moving said belt and rotating said cranks a predetermined amount.

15. An apparatus for moving a point in a predetermined pattern comprising first and second intersecting longitudinal crossbar members, each mounted on a separate pulley and cable arrangement for independent movement along respective first and second rectangular coordinate axes, first and second stationary tracks mounted respectively parallel with said first and second crossbars, a first clamp movably mounted on said first track and connected to the cable connected to said first crossbar, a second clamp movably mounted on said second track and connected to the cable connected to said second crossbar, a first piston adder device connected at one end to said first clamp and a second piston adder device connected at one end to said second clamp, a first Scotch yoke mechanism having a rotatable crank and a slotted crosshead connected to the other end of said first piston adder device, a second Scotch yoke mechanism having a rotatable crank and a slotted crosshead connected to the other end of said second piston adder device, said rotatable cranks included in said first and second Scotch yoke mechanisms having pins mounted thereon and extending through the slots of the respective associated slotted crossheads, said pins being adapted to be radially moved on said respective cranks, a belt mounted on and interconnecting said cranks of said first and second Scotch yoke mechanisms, and a third piston adder device connected to said belt for moving said belt and rotating said cranks, said rotation of said cranks driving said associated slotted crossheads linearly with sinusoidal displacement, said slotted crosshead moving said connected first and second piston adders and first and second clamps sinusoidally along said first and second tracks, said clamps moving said connected pulleys and crossbars sinusoidally along said respective first and second rectangular coordinate axes, and means connected to said first and second crossbars at their intersection for moving in a resultant path determined by said sinusoidal movements of said crossbars along said first and second rectangular coordinate axes.

16. An apparatus according to claim 15 further including means for rigidly clamping said first and second clamps to said respective first and second tracks, and means for linearly extending said first and second piston adder mechanisms for linearly moving said connected slotted crossheads of said respective Scotch yoke mechanisms, said linear movement of said slotted crossheads moving said respective pins radially on said associated cranks, said radial movement of said pins producing proportional amplitude changes in said sinusoidal displacement imparted to said associated crossheads when said cranks are rotated.

17. An apparatus according to claim 15 further including means connected to said belt for producing an angular displacement between said interconnected cranks of said first and second crossheads, said angular displacement producing a proportional phase displacement between the sinusoidal displacements produced when said cranks are rotated.

18. An apparatus for moving a point in a predetermined pattern comprising, a first member adapted to be moved in a first linear direction, first adjustable amplitude driving means connected to said first member for moving said first member in said first linear direction, a second member adapted to be moved in a second direction rectilinear to said first linear direction, second adjustable amplitude driving means connected to said second member for moving said second member in said second linear direction, third driving means connected to said first and second driving means for moving said first and second driving means harmonically, digitally controllable means coupled to said first and second adjustable amplitude driving means for selectively adjusting the amplitude thereof in accordance with digital input signals, and means connected to said first member and said second member for moving in a resultant path determined by said harmonic movements of said first and second members in said first and second linear directions.

19. Apparatus in accordance with claim 18 wherein said apparatus includes digital means for prepositioning said first and second members selectively.

No references cited.

EDGAR W. GEOGHEGAN, *Primary Examiner.*

U.S. Cl. X.R.

33—30, 1; 91—167, 411

UNITED STATES PATENT OFFICE
CERTIFICATE OF CORRECTION

Patent No. 3,422,538　　　　　　　　　　　　　　January 21, 1969

Hugo A. Panissidi

It is certified that error appears in the above identified patent and that said Letters Patent are hereby corrected as shown below:

Column 14, line 65, cancel "No references cited" and insert the following:

References Cited

UNITED STATES PATENTS

| | | | |
|---|---|---|---|
| 1,485,258 | 2/1924 | Deus | 33-27 |
| 2,347,368 | 4/1944 | Rosen | 251-3 |
| 2,720,704 | 10/1955 | McBerty | 33-27 |
| 2,980,063 | 4/1961 | Lite | 91-167 |
| 3,055,113 | 9/1962 | Grandjean | 33-18 |
| 3,266,377 | 8/1966 | Panissidi | 91-167 |

FOREIGN PATENTS

| | | |
|---|---|---|
| 841,365 | 6/1962 | Germany |
| 875,571 | 3/1953 | Germany |

Signed and sealed this 24th day of March 1970.

(SEAL)
Attest:

EDWARD M. FLETCHER, JR.
Attesting Officer

WILLIAM E. SCHUYLER, JR.
Commissioner of Patents